United States Patent [19]

Blaiklock et al.

[11] 4,095,308
[45] Jun. 20, 1978

[54] LOW PROFILE WINDSHIELD WIPER ASSEMBLY

[75] Inventors: William Blaiklock, Dundas; George McDonald, Mississauga; Edward Kimber, Cayuga, all of Canada

[73] Assignee: Tridon Limited, Burlington, Canada

[21] Appl. No.: 751,178

[22] Filed: Dec. 16, 1976

[51] Int. Cl.² .............................................. B60S 1/04
[52] U.S. Cl. .............................. 15/250.42; 15/250.19
[58] Field of Search ....................... 15/250.36–250.42, 15/250.19, 250.16

[56] References Cited

U.S. PATENT DOCUMENTS

| 2,772,436 | 12/1956 | Deibel | 15/250.42 |
| 3,082,464 | 3/1963 | Smithers | 15/250.42 |
| 3,348,257 | 10/1967 | Hadekel | 15/250.42 |

FOREIGN PATENT DOCUMENTS

| 2,011,162 | 9/1971 | Germany | 15/250.42 |
| 2,417,714 | 10/1975 | Germany | 15/250.42 |

Primary Examiner—Peter Feldman

[57] ABSTRACT

A windshield wiper assembly for use with an elongated squeegee formed of a flexible material and having a backing element operatively connected thereto includes a primary superstructure element and a plurality of separate claw carrying levers pivotally mounted thereon for engaging and supporting the backing strip of the squeegee. The pivoted levers are spring biased towards the backing strip of the squeegee in order to apply a substantially uniform pressure along the length of the squeegee.

21 Claims, 8 Drawing Figures

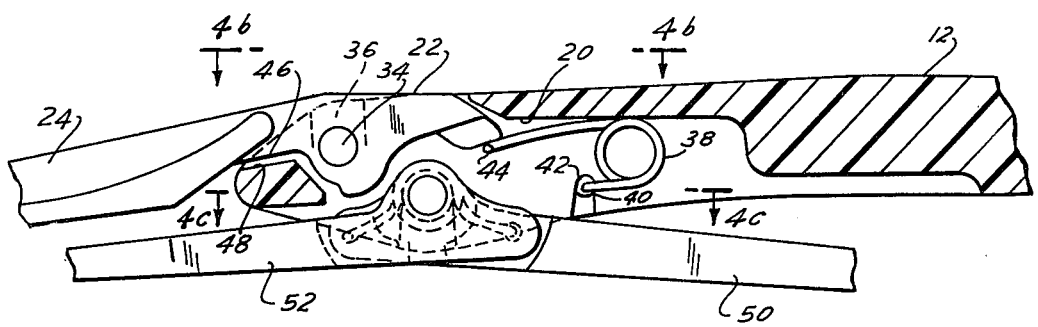
FIG. 4a
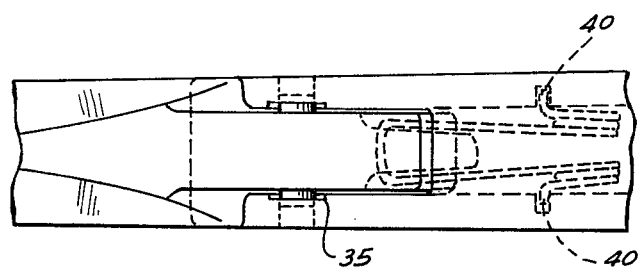
FIG. 4b
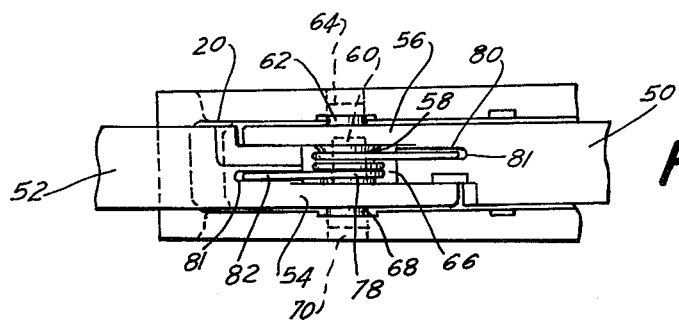
FIG. 4c
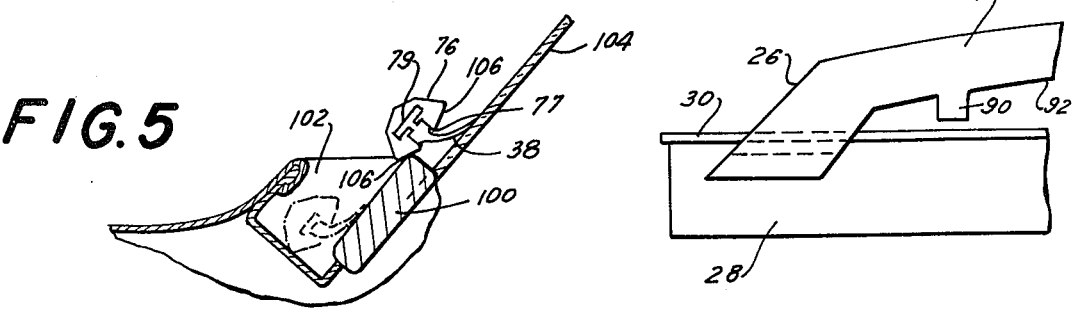
FIG. 5
FIG. 6

LOW PROFILE WINDSHIELD WIPER ASSEMBLY

The present invention relates to windshield wiper assemblies, and more particularly to a windshield wiper assembly including a superstructure arrangement in which the backing strip of a squeegee element is supported by substantially independently suspended claws.

Windshield wiper assemblies have been provided in a variety of different constructions to accomplish a variety of different ends, including accommodation of the curvature of the windshield on which the wiper is used. Different types of such previously proposed wiper assemblies have met varying degrees of success and it is an object of the present invention to provide an improved windshield wiper assembly for applying uniform wiping pressure to the squeegee of the assembly such that the squeegee has a generally uniform wiping configuration along its length.

It is a further object of the invention to provide a windshield wiper assembly which will have a relatively low profile enabling it to be used in motor vehicles of the type having recesses along the lower end of the windshield in which the wiper structures are automatically stored when not in use.

A still further object of the present invention is to provide a windshield wiper assembly which will readily follow the curvature of the windshield on which it is used.

Another object of the present invention is to provide a windshield wiper assembly which will readily move into the storage recess at the bottom of the windshield of a vehicle.

In accordance with an aspect of the present invention a windshield wiper superstructure is provided for use with an elongated squeegee formed of a flexible material having a backing element operatively connected thereto and extending lengthwise thereof. The superstructure includes a primary superstructure element for carrying the squeegee and it is adapted to be connected to a windshield wiper arm for urging the squeegee towards the windshield. The plurality of squeegee support levers are pivotally mounted on the primary superstructure and have free ends including integrally formed backing strip engaging claws. A plurality of springs are respectively associated with the levers for independently biasing the levers about their pivotal connections to a primary superstructure element thereby to urge the claws of the levers towards the windshield with which the superstructure is used. The lever lengths and spring forces are selected such that the forces applied to the backing strip apply a substantially uniform pressure to the squeegee element and permit independent movement of the claws when the superstructure is in use.

The above, and other objects, features and advantages of this invention will be apparent in the following detailed description of an illustrative embodiment which is to be read in connection with the accompanying drawings wherein:

FIG. 4a is an enlarged side view, partly in section, illustrating one of the free ends of the primary superstructure element of the wiper assembly;

FIG. 4b is a plan view taken along line 4—4 of FIG. 4a;

FIG. 4c is a bottom view taken along line 4c—4c of FIG. 4a;

FIG. 5 is a schematic end sectional view showing the operation of the camming claws used in the superstructure of the present invention; and FIG. 6 is an enlarged side view of the claw end of one of the wing levers of the superstructure showing an abutment arrangement used to aid in distributing pressure to the squeegee element.

Figure 1:
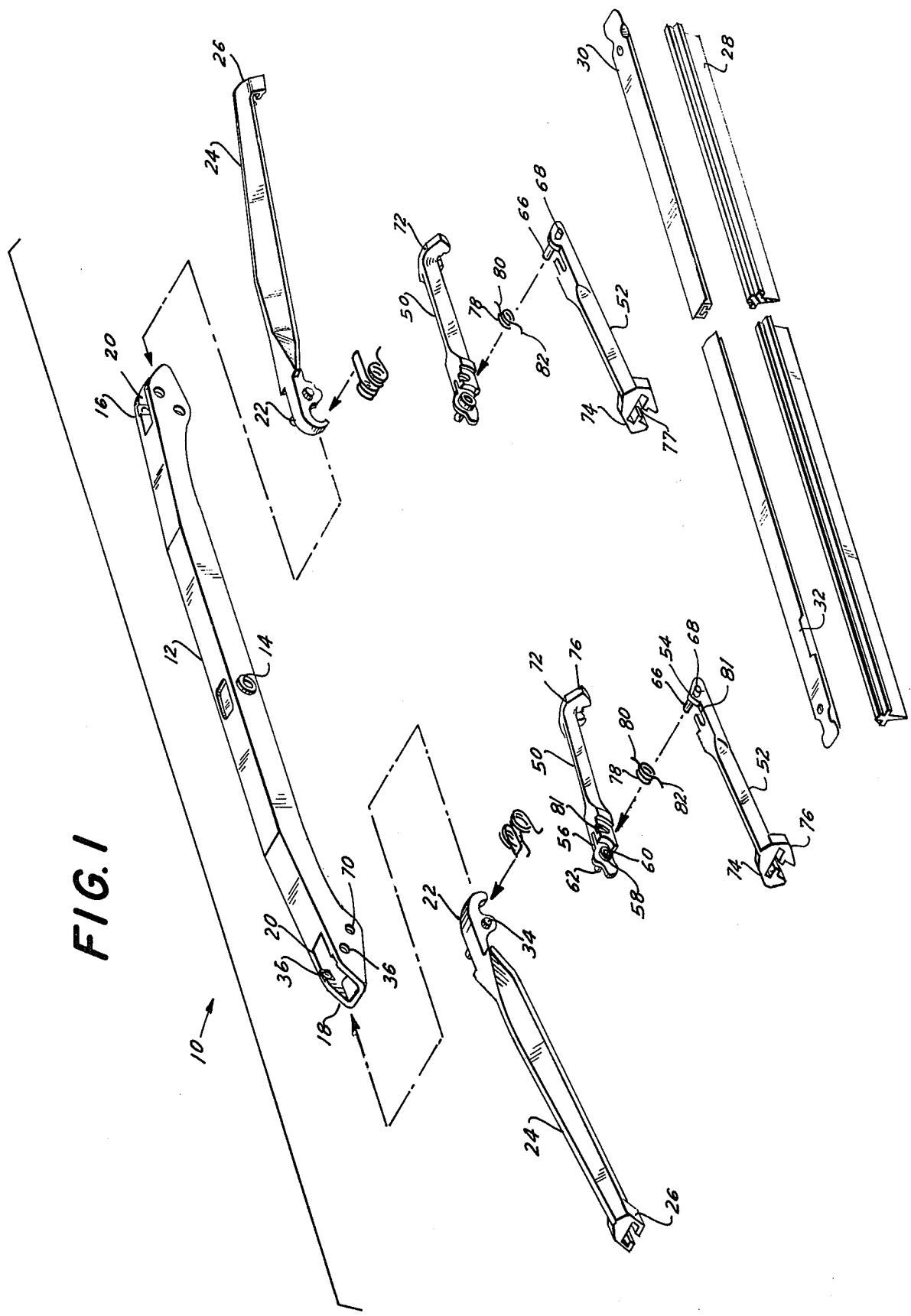
FIG. 1 is an exploded perspective view of a windshield wiper assembly constructed in accordance with the present invention.

Referring now to the drawings in detail and initially to FIG. 1 thereof, it will be seen that a windshield wiper assembly 10 constructed in accordance with the present invention includes a primary superstructure element 12 on which a plurality of claw carrying levers are pivotally mounted, as described hereinafter. The primary superstructure element 12, as well as the lever elements, are preferably formed of a hard plastic material such as a polycarbonate or other synthetic plastic material having the desired characteristics, which can be mixed with different coloring materials and surface texture producing materials in order to avoid glare and to provide color matching with the remainder of the automobile on which it is to be used. The element 12 has a slightly bowed configuration and includes an opening 14 for receiving the side pin mounting arm of a windshield wiper drive mechanism in the conventional manner.

The ends 16, 18 of element 12 are of substantially identical construction and each has a generally rectangular opening 20 formed therein for receiving the inner ends 22 of wing levers 24. These levers have a generally triangularly shaped cross section throughout substantially their entire extent, except for the hook shaped inner end portions 22 and the claw end portion 26 which, as seen in the drawing, have claw elements integrally molded therein for slidably receiving the backing strip of a squeegee element 28.

The squeegee element 28 illustrated in the drawing is retained in a backing strip element 30, in a known manner, with the backing element having a notch 32 formed along one side thereof to enable the backing element and squeegee to be inserted in and removed from the claws of the windshield wiper assembly in a manner similar to that described in U.S. Pat. Nos. 3,408,680 and 3,942,212, commonly assigned herewith. Of course other types of squeegee elements and backing strips may be used with the assembly of the present invention.

The generally rectangular recess 20 in the free ends of the primary superstructure element 12 is illustrated more clearly in FIG. 4a wherein it is seen that the inner end 22 of wing lever 24 is received within recess 20 and is pivotally mounted therein by opposed pins 34 integrally formed on the lever end 22 and received in openings 36 formed in the superstructure element. Preferably, faces of pins 34 and/or the surface portions 35 of superstructure element 12 above openings 36 are tapered to facilitate insertion of the pins in these openings by simply pushing end 22 of wing lever 24 into opening 20 with pins 34 aligned above openings 36.

The inner end 22 of wing lever 24 is operatively engaged with a U-shaped coil spring 38 located within recess 20. This coil spring has its ends 40 (see FIG. 4b) engaged in openings 42 formed in the opposed side walls of recess 20 in superstructure element 12, and its intermediate bight portion 44 engaged with the lower surface of the hook shaped end 22 of the wing lever. Because of the location of the extreme end of wing lever 24 in recess 20, surface 46 of the lever end will cooperate with the surface 48 of the recess 20 to limit downward movement of the wing lever about pivot pins 34 under the influence of spring 38. The downward movement of the lever end permitted about axis 34 occurs against the bias of spring 38. By this arrangement spring 38 continuously applies an effective downward force on the free end or claw 26 of wing lever 24, which force resists upward movement of the claw as the wiper assembly traverses the windshield. However, such upward movement is permitted so that the wing lever and claw can follow the curvature of the windshield. The wing lever 24 on the opposite side of the primary superstructure element 12 from that illustrated in FIG. 4a has the identical mounting arrangement and cooperates with an identical spring 38.

An additional pair of levers 50, 52 are also pivotally mounted within recess 20 adjacent the pivotal mounting of wing lever 24. These levers are constructed for independent pivotal movement with respect to each other and with respect to superstructure element 12 when the windshield wiper assembly is in use.

As seen more clearly in FIGS. 1 and 4 levers 50, 52 have generally complementary inner end portions 54, 56 respectively. Essentially, inner end 56 of lever 50 has a collar 58 integrally formed therein which includes a generally cylindrical recess 60. In addition end 56 includes an integral pivot pin 62 which is adapted to be received in an aperture 64 formed in one of the side walls of recess 20. The end 54 of lever 52 on the other hand includes a pin member 66 which is adapted to be received within the aperture 60 formed in collar 58 of lever 50. And, inner end 54 of lever 52 includes an additional pin 68 extending outwardly therefrom for receipt in an aperture 70 formed in the other side wall of the recess 20. In this manner, the levers are pivotally mounted on the superstructure elements 12 for essentially independent pivotal movement with respect to each other.

Each of the levers 50, 52 includes free ends 72, 74 respectively having backing strip engaging claws 76 formed thereon. These claws have a special construction, as described hereinafter, but their essential function during the operation of the wiper assembly is to engage the backing strip and independently apply pressure thereto.

Claws 76 are urged downwardly against the backing strip by a coil spring 78 which surrounds collar 58 of lever 50 and the pin 66 of lever 52, between the ends 56, 54 of the respective levers. The free ends 80, 82 of spring 78 are engaged in slots 81 formed in the ends 54, 56 of levers 50, 52 (see FIGS. 1 and 4c) in order to bias claws 76 downwardly. However in use, when the squeegee is held against a windshield, claws 76 of the lever 50, 52 will be permitted to move upwardly and downwardly with respect to the windshield independently of each other, i.e., movement of one claw 76 during use of the wiper assembly will not affect the position or operation of the other claw.

Figure 2:
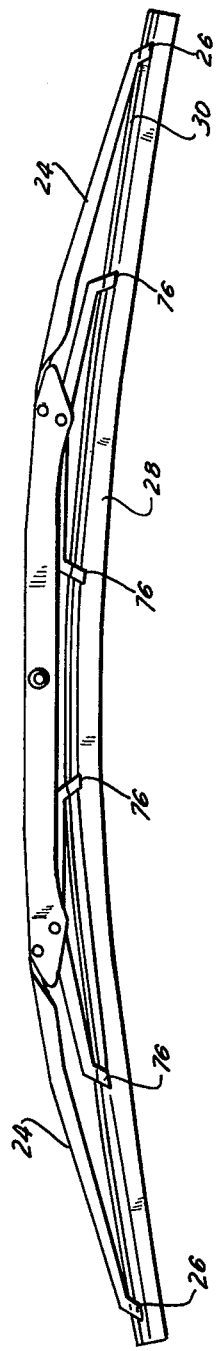
FIG. 2 is a side elevational view of the assembled windshield wiper of FIG. 1.

As illustrated in FIGS. 1 and 2 an additional pair of levers 50, 52 are pivotally mounted on the opposite end of the primary superstructure element 12, adjacent the other wing lever 24, for cooperation with a spring 78 in the same manner as the levers previously described.

With a windshield wiper arrangement of the construction described, wherein each of the claws is mounted for essentially independent movement, subject to an independent spring force applied thereto which enables the respective four elements to move independently of each other when in use, the forces applied to the claws are also independent of each other so that no load on any one claw is dependent on the load applied to any other claw. While the load applied by the wiper arm to the assembly is transmitted through the primary superstructure element 12 to each of the respective levers and their associated claws, the ultimate load applied to each claw member as the wiper is in use against the windshield is essentially independent of whatever load is being applied to any other claw. This is true independent of the curvature of the windshield, so that the curvature of the windshield below any given claw does not affect the loading of any other claw in the assembly. For example, in a sharply curved windshield if, in lieu of independent spring biased levers of the type provided in the present invention, a rigid yoke arrangement were used, such as shown for example in U.S. Pat. No. 3,348,257, then when one of the claws moves the claw on the opposite end of the yoke will also move so that it would be possible, because of the curvature in the windshield, that one claw would hold the squeegee therebelow against the windshield while the claw at the opposite end of the yoke would be lifted away from the windshielf, pulling the squeegee element therewith. Thus, by the construction of the present invention using independently suspended or biased claws each claw can track the curvature of the windshield immediately therebelow without affecting the position of any other claw.

As seen in FIG. 2 the claws 26, 76 are essentially evenly spaced along the backing strip 30. Accordingly, the effective length of squeegee beneath the claws 76 which is subjected to the force applied by those claws is about twice the length of squeegee which is subjected to the force applied by claws 26. This is because there is very little squeegee length on the outsides of claws 26. Thus, if each claw applied the same force to the backing strip 30 the force per unit length in the squeegee would be greater at the ends of the squeegee than in the center, with the result that the squeegee could be pressed over too much at its ends so that the ends would not wipe properly, or would not lay over sufficiently in the middle to perform the desired wiping function. With the present invention however because the claws are independently suspended the force applied by each claw can be controlled so that the force or pressure per unit length along the squeegee will be uniform. This is done in the present invention by providing springs 38, 78 having different spring forces so that the force applied by claws 26 to the backing strip 30 will be less than the forces applied by claws 76 so that the resulting pressure in the squeegee is substantially uniform along its length and the squeegee lays over substantially uniformly during the wiping operation.

With previously proposed windshield superstructure arrangements it often occurred that the plastic backing strip of the squeegee assembly obtained a permanent set after some use, since it was usually rigidly held between fixed claws, i.e. claws that could not move with respect to each other. This permenant set would result, for example, in a flat center portion in the backing strip with its ends sloped downwardly. Thus a non-uniform pressure would be applied to the squeegee which would result in portions of the squeegee possibly lifting off the windshield under wind loads at the points along the squeegee where too low a pressure was applied. With the present invention the flexible support provided by the independently suspended claws reduces the possibility of permanent set in the backing strip and ensures that substantially uniform pressure is applied to the squeegee.

Figure 3:
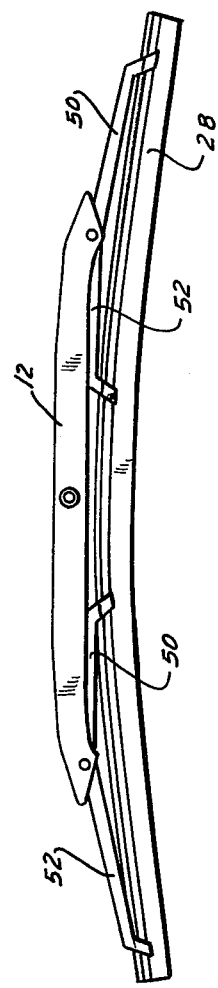
FIG. 3 is a side elevational view similar to FIG. 2 showing another embodiment of the present invention.

In the embodiment of the invention illustrated in FIGS. 1 and 2 the windshield wiper assembly is provided with six independently suspended claws, one on the end of each of the respective lever elements. This wiper arrangement is suitable for a large size wiper assembly, such as for example an assembly adapted to carry an eighteen inch long squeegee element. However, for smaller squeegees a somewhat smaller arrangement can be provided. Thus for example as illustrated in FIG. 3 for a fifteen or sixteen inch wiper assembly wing levers 24 may be eliminated, but the remainder of the structure of the assembly is the same, including the independently pivoted and biased levers 50, 52 at the opposite ends of the primary superstructure element 12. Other configurations of levers can also be provided.

As mentioned above, the pressure per unit length applied at the ends of the squeegee in windshield wiper assemblies is often greater than the pressure per unit length applied along the interior portions of the squeegee because there is simply less squeegee located in the area of the end claws. As a result of this phenomena the squeegee often may not operate properly beneath the end claws because the pressure which is effectively applied to the ends tends to flatten the squeegee out against the windshield. In addition to independently suspending the claws to permit different forces to be applied to the backing strip in order to overcome this, the pressure applied by the end claws of the wiper assembly may also be distributed more evenly along the backing strip by providing an abutment or stop 90 on the lower surface of the outer lever inwardly of the claw 26, as seen in FIG. 6, for the purpose of bearing against the backing strip inwardly of its associated claw. As a result, the force which would normally be applied to the backing strip solely by the claw is applied both by the claw and abutment 90 over a greater length of squeegee, thereby insuring a more uniform distribution of pressure along the backing strip of the assembly. The abutment 90 may be used with wiper assemblies having independently suspended claws as described above, but it is contemplated that it can be used with other conventional wiper assemblies as well. In fact, this abutment is particularly applicable to wipers which do not have independently suspended claws since in those wipers there is a far greater possibility of having non-uniform pressure present in the squeegee.

As mentioned, one of the objects of the present invention is to provide a superstructure assembly for a windshield wiper which has a relatively low profile. This is accomplished by the structural arrangement illustrated in the drawings with the aid of a plurality of levers constructed to have a small angle of inclination with respect to the surface of the windshield, so that the entire assembly can be as close to the windshield as possible. This low profile type of windshield wiper assembly is used primarily with vehicles of the type having a recess or storage chamber positioned in or below the hood of the vehicle directly in front of the windshield and into which the wiper assemblies are retracted when the windshield wiper mechanism of the vehicle is shut off. Since the recess has a limited height the wiper assembly must have a height which is sufficient to enable it to be received within that recess. One problem with such retractable windshield wiper assemblies is that often the windshield will be provided with a cowling 100 (see FIG. 5), such as for example a chrome strip, along its bottom edge adjacent the recess. Thus the windshield wiper assembly must ride over this cowling in order to enter the recess to its hidden position. However, with many previously proposed windshield wiper assemblies the squeegee element of the wiper, and in particular its body portion (i.e. the portion between the neck and wiping edge) is the leading portion of the assembly during a wiping operation and is thus the first part of the assembly to engage the cowling. The squeegee often will become caught on the cowling and prevent proper retraction of the assembly into recess 102 below the windshield 104. And, with high pressure wiper arm structures, pressure is sometimes concentrated on one portion of the squeegee so that it flattens out on the windshield as it approaches the cowling. In that condition the wiper assembly cannot ride up on the cowling into the recess 102.

In accordance with the present invention this problem is avoided by the special configuration of the claw elements 76 used on inner levers 50, 52. These claw elements preferably have a somewhat greater width and a substantially greater depth than typical claw elements in molded plastic windshield wiper assemblies, so as to define a slot 77 which extends downwardly from adjacent the neck of the squeegee 38 (which is supported in backing strip 32 held in the horizontal slot 79 of the claw) along the body portion of the squeegee. This brings the lowermost portion of the claw closer to the windshield 104 whereby outwardly and upwardly extending cam surfaces are provided on the exterior sides of the claws. Preferably these cam surfaces 106 extend from positions adjacent the body of the squeegee element outwardly and upwardly away from the squeegee at an angle of about 30° from the wiping plane of the wiper assembly. These cam surfaces will then be the leading portion of the wiper assembly during a wiping operation and will engage the cowling 100 before any other portion of the windshield wiper assembly to cam the assembly upwardly onto the cowling with the squeegee 38, thereby insuring proper movement of the assembly into recess 102. While cam surfaces 106 are shown on both sides of the claws, it is contemplated that only the side of the claw which faces the cowling need have the cam surface thereon.

Accordingly it is seen that a relatively simply constructed windshield wiper assembly is provided which has a low profile suitable for use with vehicles having the presently popular hidden windshield wiper arrangements and in which the pressure applied to the backing strip of the squeegee assembly by the independently suspended spring biased claws results in a substantially uniform pressure along the squeegee and causes the squeegee to lay over in its wiping position in a substantially uniform manner.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A windshield wiper superstructure comprising a primary superstructure element adapted to be connected to a windshield wiper arm; a plurality of claw carrying superstructure elements pivotally mounted on said primary superstructure element and spring means operatively associated with said primary superstructure element and with said claw carrying elements for independently biasing said claw carrying elements about their pivotal connection to the primary superstructure element to urge the claws thereon towards the windshield on which the superstructure is used; said primary superstructure element including a pair of opposed ends and said plurality of claw carrying superstructure elements including two pairs of lever elements respectively located at said opposed ends of said superstructure element with each lever in each pair being pivotally mounted on the adjacent end of the superstructure element at one of its ends fOr substantially independent pivotal movement of each lever element when the superstructure is in use.

2. A windshield wiper superstructure as defined in claim 1 wherein the levers in said pairs of levers are mounted for pivotal movement about a common pivot axis.

3. A windshield wiper superstructure as defined in claim 2 wherein said plurality of claw carrying superstructure elements includes a pair of elongated levers respectively pivotally mounted adjacent said opposed ends of the primary superstructure element.

4. A windshield wiper superstructure as defined in claim 3 wherein each of said levers has a free end and includes an integral claw member formed thereon for slidably engaging the backing strip of a windshield wiper squeegee.

5. A windshield wiper superstructure as defined in claim 3 wherein said spring means comprises a plurality of coil springs respectively associated with said levers.

6. A windshield wiper superstructure as defined in claim 4 wherein the claw members of at least said first mentioned pairs of levers have a pair of generally vertically extending spaced side wall portions defining a slot therebetween through which the body of the squeegee extends, said side walls extending along opposite sides of the squeegee body away from the neck of the squeegee and the backing strip to lower ends at a position near the wiping portion of the blade, and at least one cam surface extending upwardly and outwardly from one of said lower ends, adjacent the wiping portion of the blade for leading the superstructure in a wiping operation to cam the superstructure over obstacles.

7. A windshield wiper superstructure for use with an elongated squeegee formed of a flexible material having a backing element operatively connected thereto and extending lengthwise thereof; said superstructure comprising a primary superstructure element for carrying said squeegee and adapted to be connected to a windshield wiper arm for urging the squeegee towards the windshield; a plurality of squeegee support levers pivotally mounted on said primary superstructure element having free ends including integrally formed claws thereon for releasably engaging and supporting the backing element of the squeegee; and spring means respectively associated with said levers for independently biasing said levers about their pivotal connection to the primary superstructure element thereby to urge said claws thereon towards the windshield with which the superstructure is used and permit independent movement of the claws when the superstructure is in use; said primary superstructure element including a pair of opposed ends and said plurality of squeegee support levers including two pairs of lever elements respectively located at said opposed ends of said superstructure element with each lever in each pair being pivotally mounted on the adjacent end of the superstructure element at one of its ends for substantially independent pivotal movement of each lever element when the superstructure is in use.

8. A windshield wiper superstructure as defined in claim 7 wherein the levers in said pairs of levers are mounted for pivotal movement about a common pivot axis.

9. A windshield wiper superstructure as defined in claim 8 including a coil spring positioned on said common pivot axis of each of said pairs of levers and having opposed ends respectively engaged with said levers whereby said coil springs permit substantially independent pivotal movement of their associated levers when in use.

10. A windshield wiper superstructure as defined in claim 9 wherein said levers of said pairs of levers have inner end portions pivotally mounted on said common pivot axis within their associated end of said primary superstructure element.

11. A windshield wiper superstructure as defined in claim 7 wherein said plurality of squeegee support levers includes at least one wing lever having an inner end pivotally mounted on one of said opposed ends of the primary superstructure adjacent the pivotal mounting of one of said pairs of levers and an outer end remote from said primary superstructure element and having an integral squeegee support claw formed thereon.

12. A windshield wiper superstructure as defined in claim 11 wherein said wing lever and its associated pair of levers are pivotally mounted on said primary superstructure element on different pivot axes which are spaced from each other.

13. A windshield wiper superstructure as defined in claim 12 wherein said spring means includes a separate spring connected between said primary superstructure element and said wing lever at the inner end thereof on the side of said wing lever pivotally mounted opposite its claw whereby said inner end of the wing lever is normally biased upwardly with respect to the primary superstructure element while the claw of the wing lever is biased downwardly with respect thereto into engagement with said backing strip.

14. A windshield wiper assembly as defined in claim 13 including two of said wing levers respectively mounted on opposite ends of said primary superstructure element.

15. A windshield wiper superstructure as defined in claim 14 wherein the levers in said pairs of levers are mounted for pivotal movement about a common pivot axis.

16. A windshield wiper superstructure as defined in claim 15 including a coil spring positioned on said common pivot axis of each of said pairs of levers and having opposed ends respectively engaged with said levers whereby said coil springs permit substantially independent pivotal movement of their associated levers when in use.

17. A windshield wiper superstructure as defined in claim 16 wherein said levers of said pairs of levers have inner end portions pivotally mounted on said common pivot axis within their associated end of said primary superstructure element.

18. A windshield wiper superstructure as defined in claim 7 wherein the claw members of at least said first mentioned pairs of levers have a pair of generally vertically extending spaced side wall portions defining a slot therebetween through which the body of the squeegee extends, said side walls extending along opposite sides of the squeegee body away from the neck of the squeegee and the backing strip to lower ends at a position near the wiping portion of the blade, and at least one cam surface extending upwardly and outwardly from one of said lower ends, adjacent the wiping portion of the blade fOr leading the wiper superstructure in a wiping operation to cam the superstructure over obstacles.

19. A windshield wiper superstructure for use with an elongated squeegee formed of a flexible material having a backing element operatively connected thereto and extending lenthwise thereof; said superstructure including a primary superstructure element for carrying said squeegee and adapted to be connected to a windshield wiper arm for urging the squeegee towards the windshield; and a plurality of squeegee support elements pivotally mounted on said primary superstructure element and having free ends including integrally formed claws thereon for releasably engaging and supporting the backing element of the squeegee; at least one of said claws having a pair of generally vertically extending spaced side wall portions defining a slot therebetween through which the body of the squeegee extends, said side walls extending along opposite sides of the squeegee body away from the neck of the squeegee and the backing strip to lower ends at a position near the wiping portion of the blade and at least one cam surface extending upwardly and outwardly from one of said lower ends adjacent the wiping portion of the blades for leading the superstructure in a wiping operation to cam the superstructure over obstacles.

20. A windshield wiper superstructure as defined in claim 19 wherein said at least one cam surface on said claws cOmprises an inclined surface extending from a position adjacent the squeegee upwardly and outwardly to a position at the maximum width of the claw.

21. A windshield wiper assembly as defined in claim 20 wherein said inclined surface defines an angle on the order of 30° with respect to the plane of a backing strip supported in the claw.

* * * * *